(12) United States Patent
Sakai et al.

(10) Patent No.: US 7,215,861 B2
(45) Date of Patent: May 8, 2007

(54) OPTICAL CONTROL DEVICE

(75) Inventors: Atsushi Sakai, Kanagawa (JP); Ikuo Katoh, Kanagawa (JP); Toshihiko Baba, Tokyo (JP)

(73) Assignees: Ricoh Company, Ltd., Tokyo (JP); National University Corporation Yokohama National University, Yokohama-shi (JP)

( * ) Notice: Subject to any disclaimer, the term of this patent is extended or adjusted under 35 U.S.C. 154(b) by 0 days.

(21) Appl. No.: 11/258,923

(22) Filed: Oct. 27, 2005

(65) Prior Publication Data

US 2006/0110116 A1 May 25, 2006

(30) Foreign Application Priority Data

Oct. 29, 2004 (JP) ............................. 2004-314918

(51) Int. Cl.
*G02B 6/10* (2006.01)
*G02B 6/12* (2006.01)

(52) U.S. Cl. .................... 385/129; 385/14; 385/130; 385/132

(58) Field of Classification Search ................ 385/14, 385/129, 130, 132
See application file for complete search history.

(56) References Cited

U.S. PATENT DOCUMENTS

| 5,719,981 | A | 2/1998 | Katoh et al. ................ 385/129 |
| 6,542,682 | B2* | 4/2003 | Cotteverte et al. .......... 385/125 |
| 6,640,034 | B1* | 10/2003 | Charlton et al. ............ 385/122 |
| 6,795,621 | B2* | 9/2004 | Tokushima ................... 385/50 |
| 6,937,781 | B2* | 8/2005 | Shirane et al. ............... 385/16 |
| 2005/0002605 | A1 | 1/2005 | Sakai et al. ................... 385/27 |
| 2005/0117866 | A1* | 6/2005 | Park et al. .................. 385/129 |
| 2005/0152659 | A1 | 7/2005 | Baba et al. ................. 385/129 |

FOREIGN PATENT DOCUMENTS

DE 102 56 263 A1 7/2004

(Continued)

OTHER PUBLICATIONS

Marcelo Davanco, et al., "Exploring Slow and Dispersive Propagation in 2D Line-Defect Photonic Crystal Waveguides", 16th. Annual Meeting of the IEEE Lasers & Electro-Optics Society., vol. 1 of 2, XP-010676392, Oct. 26, 2003, pp. 216-217.

(Continued)

*Primary Examiner*—Sung Pak
*Assistant Examiner*—Daniel Petkovsek
(74) *Attorney, Agent, or Firm*—Oblon, Spivak, McClelland, Maier & Neustadt, P.C.

(57) ABSTRACT

An optical control device includes a photonic crystal and a line-defect waveguide formed in the photonic crystal wherein the optical control device is capable of guiding, through the line-defect waveguide, a light having a wavenumber larger than a wavenumber corresponding to an anti-intersection of an even-mode band and an odd-mode band, the even-mode band and odd-mode band being a waveguide band of the line-defect waveguide, wherein the even-mode band of the line-defect waveguide includes two or more inflection points in a wavenumber region larger than a wavenumber corresponding to an intersection of the even-mode band and said odd-mode band, the optical control device guiding a light having a frequency in the vicinity of the inflection point.

13 Claims, 14 Drawing Sheets

FOREIGN PATENT DOCUMENTS

| | | |
|---|---|---|
| EP | 1 219 984 A2 | 7/2002 |
| JP | 2000-121987 | 4/2000 |
| JP | 2002-333536 | 11/2002 |
| JP | 2005-274840 | 10/2005 |

OTHER PUBLICATIONS

Y. Tanaka, et al., "Group velocity dependence of propagation losses in single-line-defect photonic crystal waveguides on GaAs membranes", Electronics Letters, vol. 40, No. 3, XP-006021378, Feb. 5, 2004, 2 pages.

A. Yu Petrov, et al., "Zero dispersion at small group velocities in photonic crystal waveguides", Applied Physics Letters, vol. 85, No. 21, XP-001232961, Nov. 22, 2004, pp. 4866-4868.

A. Sakai, et al., "Anomalous Low Group Velocity and Low Dispersion in Simple Line Defect Photonic Crystal Waveguides", Lasers and Electro-Optics Society, vol. 2, XP-010749031, Nov. 8, 2004, pp. 884-885.

Koji Yamada, et al., "Improved line-defect structures for photonic-crystal waveguides with high group velocity", Optics Communications, vol. 198, No. 4-6, XP-004323185, Nov. 1, 2001, pp. 395-402.

D. Mori, et al., "Chirped photonic crystal waveguides", Lasers and Electro-optics, vol. 1, XP-010745816, May 17, 2004, pp. 1167-1168.

Kiyoshi Asakawa, "Fabrication and Characterization of Photonic Crystal Slab Waveguides and Application to Ultra-Fast All-Optical Switching Devices", Transparent Optical Networks, vol. 1, XP-010681430, Jun. 29, 2003, pp. 193-197.

X. Letartre, et al., "Group velocity and propagation losses measurement in a single-line photonic-crystal waveguide on InP Membranes", Applied Physics Letters, vol. 79, No. 15, XP-012029069, Oct. 8, 2001, pp. 2312-2314.

M. Notomi, et al., "Extremely Large Group-Velocity Dispersion of Line-Defect Waveguides in Photonic Crystal Slabs", Physical Review Letters, vol. 87, No. 25, Dec. 17, 2001, pp. 253902-1-253902-4.

Takashi Sato, et al., "In-Plane Light Propagation in $Ta_2O_5/SiO_2$ Autocloned Photonic Crystals", IEEE Journal of Quantum Electronics, vol. 38, No. 7, Jul. 2002, pp. 904-908.

Daisuke Mori, et al., "Dispersion-controlled optical group delay device by chirped photonic crystal waveguides", Applied Physics Letters, vol. 85, No. 7, Aug. 16, 2004, pp. 1101-1103.

\* cited by examiner

OPTICAL CONTROL DEVICE

BACKGROUND OF THE INVENTION

The present invention generally relates to optical control devices formed on a photonic crystal. More specifically, the present invention relates to a compact and high-performance optical control device for use in the field of optical communication such as high-speed and large-capacity optical signal transmission or high-speed optical signal processing. Further, the present invention relates to an optical control device capable of realizing apparatuses and devices such as compact optical pulse delay devices providing a large delay in the group velocity, dispersion compensation devices providing large dispersion compensation effect, non-linear optical devices providing high efficiency, lasers operating with high efficiency, optical routing devices and advanced optical information processing apparatuses, optical buffer devices, and the like.

In the art of high-speed and large capacity optical communication or high-speed optical signal processing, the phenomenon of dispersion, which induces decay in the optical pulses transmitted along an optical fiber, or skew, which causes a change in the arrival time of optical signals transmitted along an optical fiber, poses a serious problem to be overcome in order to achieve further increase of transmission speed.

In order to solve these problems, there is a need of a device capable of controlling the velocity of optical energy, which determines the dispersion characteristic or signal arrival time, while this means that there is a need for a device capable of controlling the amount of delay in the group velocity of optical pulses.

Conventionally, such delay of optical pulses in terms of group velocity has been controlled by using an optical fiber having a singular dispersion characteristic. According to this approach, the length of the optical fiber used for transmitting the optical signals is adjusted such that there is realized an optimum amount of delay in terms of the group velocity for the optical signals transmitted along the optical fiber.

However, because of small dispersion caused by such an optical fiber, there is a need of using a long optical fiber for achieving the desired control of delay of the optical signals, and there arises a problem that the optical control device inevitably has a large size even in the case the optical fiber is coiled to reduce the size thereof. Further, because of the small degree of freedom in the dispersion characteristics of the optical fiber, it is not possible with this approach to achieve downsizing or integration, which is necessary for realizing advanced signal processing, or parallel signal processing that includes a number of transmission paths.

Further, with regard to the compensation of dispersion, this conventional technology enables precise dispersion control or adjustment of dispersion compensation by using a chirped fiber grating technology, in which there is formed a grating in the optical fiber such that the period of the grating is changed gradually.

However, because of the small dispersion provided by the optical fiber, it is necessary with this approach to use a long optical fiber in the order of meters for achieving the desired compensation effect of dispersion, and thus, it is not possible to achieve downsizing or integration for optical control devices.

Further, with the technology of such a fiber grating device having the chirp structure, a reflected light is used in addition to the incoming light, and there is a need of providing a structure for separating the incoming signals and outgoing signals for efficient operation. This also poses an adversary problem with regard to downsizing and integration of the optical control device.

As an alternative of realizing low optical group velocity, there is known an approach of confining the light by using a multilayer film in the form of optical multiple reflection. However, such a construction of using multilayer film for achieving low optical group velocity or dispersion control has a problem, associated with small effect of optical confinement of the multilayer film, in that the size of the device becomes inevitably large, and the device suffers from the problem of spreading of the optical signals by diffraction. Thus, it is difficult with this approach to control the dispersion as desired.

In view of these problems, Patent Reference 1 and Patent Reference 2 disclose a dispersion compensation device that uses a photonic crystal, wherein a photonic crystal is a multi-dimensional periodic structure formed by different refractive indices.

More specifically, the wavelength dispersion compensation device of Patent Reference 1 has a construction of injecting an incident optical pulse having a wavelength-dispersion and hence an associated chirp into an edge surface of a photonic crystal in which media of different refractive indices are arranged in the form of two-dimensional lattice.

The optical pulse thus injected undergoes a decrease of chirp as it is transmitted through the photonic crystal as a result of the dispersion characteristic of the photonic crystal.

Further, the wavelength dispersion device of Patent Reference 2 compensates for the wavelength dispersion by utilizing the dispersion characteristics of light that is guided along an optical waveguide, which is formed in the photonic crystal in the form of defect.

In a photonic crystal per se, or in an optical waveguide called defect waveguide, which is formed in a photonic crystal by introducing a line-shaped defect thereto, there appears a singular dispersion characteristic, which describes the relationship between frequency and wavenumber.

On the other hand, with the wavelength dispersion device of Patent Reference 1, in which the transmitted light is not confined into a waveguide structure in the photonic crystal, there appears a problem of poor reliability associated with its large angular dependence. Further, the device of this reference is deemed not practical in view of difficulty of achieving downsizing.

On the other hand, it is theoretically predicted that the group velocity should become zero in a line-defect waveguide at the Brillouin zone edge called also band edge. It should be noted that a line-defect waveguide is a waveguide formed in a photonic crystal in the form of a continuous line-defect. Patent Reference 1 reports observation of a very small group velocity of $1/90$ the velocity of light in vacuum.

On the other hand, such a line-defect waveguide is generally accompanied with a very large wavelength dispersion, and because of this, while it is certainly possible to decrease the group velocity when a short optical pulse having a spread spectrum is injected into such a structure, there arises an adversary problem of dispersion in that the optical pulse undergoes excessive spreading because of the spreading of the spectrum width.

Further, with the structure of Patent Reference 2 called coupled-defect waveguide, in which point-shaped defects are arranged periodically, a relatively large dispersion is achieved over a relatively wide band width. Because the value of dispersion is larger than the dispersion in an optical fiber by the order of six ($10^6$), there is a possibility that a fiber dispersion compensation device, which has needed the size of the order of kilometers, is subjected to downsizing to the size of millimeters.

However, when such a coupled-defect waveguide is formed in a slab-formed photonic crystal, which can be produced relatively easily, there appears a fundamental problem in that the light in the photonic crystal is scattered in the direction perpendicular to the surface on which the photonic crystal is formed because of diffraction caused by the photonic crystal, in view of the fact that the period of repetition is increased in the propagating direction of the light. Thereby, there is caused a problem of very large optical loss.

REFERENCES

PATENT REFERENCE 1 Japanese Laid-Open Patent Application 2000-121987
PATENT REFERENCE 2 Japanese Laid-Open Patent Application 2002-333536
PATENT REFERENCE 3 United States Patent Application Publication 2005/0152659A1
NON-PATENT REFERENCE 1 Physical Review Letters vol. 87, 253902, (2001)

SUMMARY OF THE INVENTION

Accordingly, it is an object of the present invention to provide a novel and useful optical control device wherein the foregoing problems are eliminated.

Another and more specific object of the present invention is to provide a compact optical control device capable of providing a very small group velocity, zero dispersion at the frequency corresponding to the small group velocity, capability of controlling the group velocity and dispersion, and capability of being manufactured easily.

In more detail, it is the object of the present invention to provide an optical control device having a very small group velocity and an even-mode band characterized by zero-frequency dispersion for the group velocity at the frequency that provides the foregoing very small group velocity.

Another object of the present invention is to provide an optical control device capable of controlling the group velocity by way of controlling the even-mode band.

Another object of the present invention is to provide an optical control device capable of carrying out dispersion control effectively while maintaining the low group velocity.

Another object of the present invention is to provide an optical control device achieving the low group velocity and zero-dispersion at the same time, capable of performing active control, and capable of being manufactured easily.

The present invention provides an optical control device comprising:

a photonic crystal comprising a periodic repetition of an element; and a line-defect waveguide formed in said photonic crystal in the form of a line-shaped defect, said optical control device being capable of guiding, through said line-defect waveguide, a light having a wavenumber larger than a wavenumber corresponding to an anti-intersection of an even-mode band and an odd-mode band, said even-mode band and odd-mode band being a waveguide band of said line-defect waveguide formed in said photonic crystal, said even-mode band of said line-defect waveguide including two or more inflection points in a wavenumber region larger than a wavenumber corresponding to an intersection of said even-mode band and said odd-mode band, said optical control device guiding a light having a frequency in the vicinity of said inflection point.

According to a preferred embodiment, said photonic crystal comprises an array of circular-shaped patterns disposed in a medium with a predetermined interval, each circular-shaped pattern constituting said element and having a radius determined such that a ratio of said radius to said predetermined interval falls in a range of 0.35 or more but not exceeding 0.50, said predetermined interval being a distance measured from a center of a first circular-shaped pattern and a center of a second circular-shaped pattern adjacent to said first circular pattern.

In another preferred embodiment, said line-defect waveguide has a refractive index different from a part of said photonic crystal where there is formed a periodic structure of said element.

In another preferred embodiment, a periodic structure of said element constituting said photonic crystal is modified in the vicinity of said line-defect waveguide.

In another preferred embodiment, said photonic crystal is formed of an array of circular patterns each forming said element, and wherein a radius of said circular patterns is changed in the vicinity of said line-defect waveguide as compared with a remaining part of said photonic crystal.

In another preferred embodiment, said line-defect waveguide has a width different from a width formed by removing a row of said elements.

In another preferred embodiment, said line-defect waveguide has a width smaller than a width formed in said photonic crystal by removing a row of said elements by a factor of 0.70 or more but not exceeding 1.00.

In another preferred embodiment, said line-defect waveguide has a distributed profile of refractive index that changes continuously in a propagation direction of light in said line-defect waveguide. With this construction, dispersion control is achieved effectively while maintaining low group velocity.

In another preferred embodiment, said line-defect waveguide is formed by removing a row of elements constituting said photonic crystal. With this construction, fabrication of the optical control device is made easily.

In another preferred embodiment of the present invention, said photonic crystal is formed by arranging circular holes of low refractive index each forming said element in said medium two-dimensionally in the form of a triangular lattice.

In a further preferred embodiment of the present invention, said photonic crystal is formed by using a dielectric thin film for said medium. The dielectric thin film includes a semiconductor material, electro-optic material or non-linear optic material, wherein these materials are capable of confining light therein and hence in the line-defect waveguide, effectively.

According to the present invention, it becomes possible to provide a line-defect waveguide of low group velocity and zero-dispersion hitherto not possible to realize with the technology of ordinary line-defect waveguide, by inducing two or more inflection points in the even-mode band for the wavenumber region larger than a wavenumber corresponding to an anti-crossing point of the even-mode band and the odd-mode band of the line-defect waveguide.

Such inflection points can be formed by controlling the radius of the low refractive index elements repeated to form the photonic crystal with regard to the period of repetition of thereof in the photonic crystal in the part of the photonic crystal where the line-defect waveguide is formed, or by providing a distributed refractive index profile to the line-defect waveguide, or by changing the shape or size of the low refractive index part constituting the elements of the photonic crystal in the vicinity of the line-defect waveguide.

Further, the problem of increased loss pertinent to the photonic crystal of slab structure is successfully avoided by using a simple line-defect waveguide. Thereby, the optical control device of the present invention can use the region substantially free from optical loss.

Further, by applying the present invention to a line-defect waveguide of the type of distributed refractive index profile, the function of the optical control device can be realized by a single line-defect waveguide, and complex designing for synthesizing plural bands is eliminated. Further, the optical control device of the present invention is suitable for high-density integration.

Further, by utilizing the optical control device of the present invention, it becomes possible to realize various devices such as an optical pulse delay device having a very compact size hitherto not possible and at the same time providing a large delay amount in the group velocity, a dispersion compensation element of large effect, a non-linear device of high efficiency, a highly efficient laser, or the like.

Further, by controlling the refractive index, it becomes possible to control the group velocity or frequency dispersion thereof actively, and with the optical control device of the present invention, various apparatuses of versatile functions, such as optical routing device or advanced optical information processing apparatus or optical buffer apparatus, are realized.

DETAILED DESCRIPTION OF THE INVENTION

First Embodiment

Figure 1:
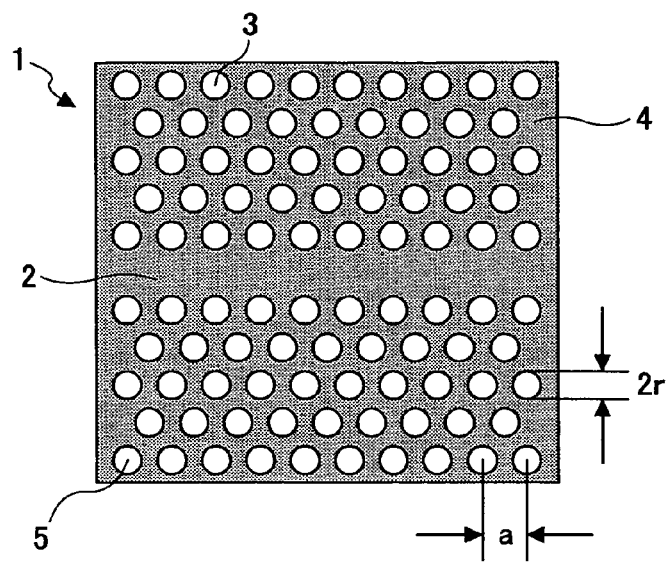
FIG. 1 is a plan view diagram schematically showing the construction of an optical control device according to the present invention.

FIG. 1 is a plan view diagram showing the construction of an optical control device according to an embodiment of the present invention schematically.

Referring to FIG. 1, the optical control device 1 comprises a two-dimensional photonic crystal slab 3 formed with a line-defect waveguide 2.

It should be noted that, while explanation hereinafter will be made for the case the optical control device 1 is constructed on such a two-dimensional photonic crystal slab 3, it is also possible to construct the optical control device 1 on a three-dimensional photonic crystal. Further, there is caused no essential difference when the two-dimensional photonic crystal slab 3 is sandwiched from above and below by a pair of non-total reflection structures. Thus, the description will be made hereinafter only for the simple case of using the two-dimensional photonic crystal slab structure for the basis of the optical control device.

As shown in FIG. 1, the photonic crystal slab 3 includes a high refractive index medium 4 and a number of air holes 5 formed in the high refractive index medium 4, wherein the air holes 5 are arranged to form a triangular lattice. This structure of photonic crystal 3 of arranging the holes in a high refractive index medium is used extensively as such a construction, when formed as a two-dimensional photonic crystal, enables optical confinement in the vertical direction easily. Hereinafter, the holes 5 may be referred to also as "elements".

On the other hand, it is also possible to use a photonic crystal of pillar type, as long as it is possible to achieve optical confinement in the vertical direction. Further, while the holes 5 have an isotropic circular shape in the present embodiment, it is also possible to form the photonic crystal by periodically arranging polygons when it is necessary. Further, it is possible that the holes 5 may be arranged in the form of any of triangular lattice, square lattice, honeycomb lattice, or the like. Further, the arrangement of the holes 5 is not limited to a periodic one, but any arrangement may be used as long as the arrangement of the holes 5 provides an optical property of a photonic crystal or an optical property similar to a photonic crystal.

Hereinafter, description will be made for the case in which the holes 5 have a circular shape and the photonic crystal 3 is formed by arranging the circular holes 5 in the form of a triangular lattice. Thereby, it is assumed that the photonic crystal 3 forms an air bridge structure in that an air layer exists underneath the part that performs the function of photonic crystal. Further, the description hereinafter will be made for the case in which the high refractive index medium 4 has a large refractive index of 3.0 and for the case in which the high refractive index medium has a medium refractive index of 2.0.

In the case of a photonic crystal slab, there is formed a structure in which a medium of large refractive index is sandwiched by a pair of media of low refractive index, and the photonic crystal is formed in the medium of large refractive index.

When a semiconductor material such as silicon is used for this medium of large refractive index, the medium has a refractive index of about 3.

Figure 2:
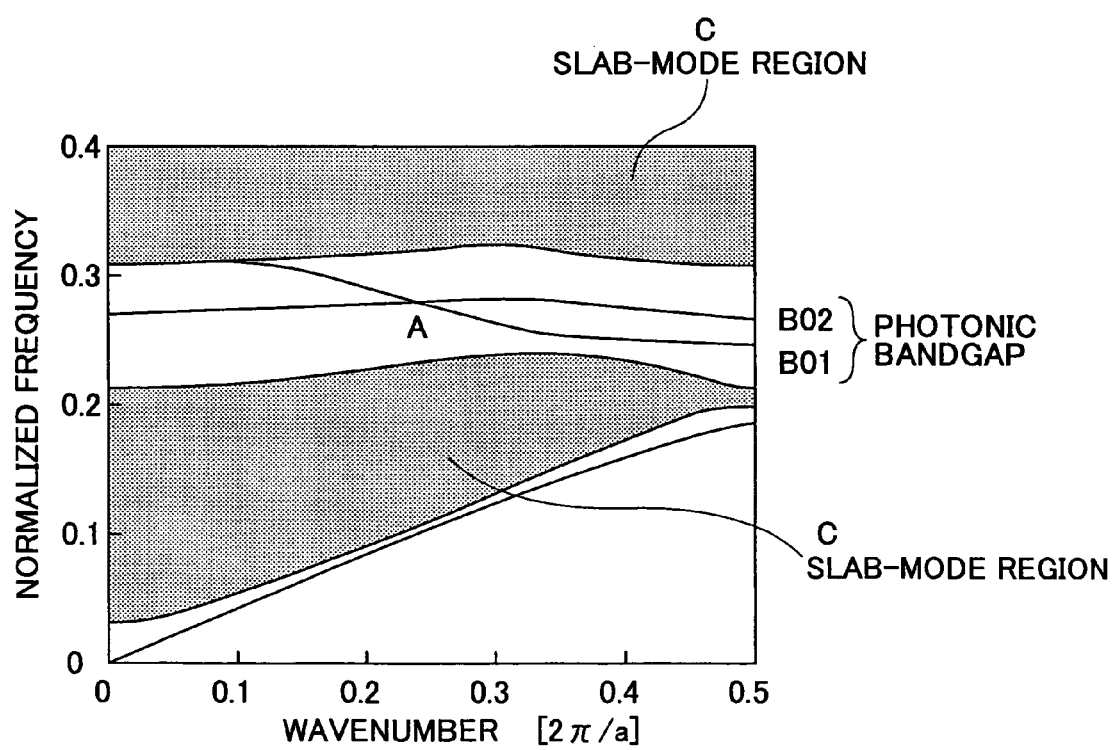
FIG. 2 is a photonic band diagram of the optical control device of FIG. 1.

FIG. 2 shows the result of calculation of the photonic band structure for the model structure of FIG. 1 in which the line-defect waveguide 2 is formed in the two-dimensional photonic crystal 3 by eliminating therefrom holes 5 aligned in a single row. Here, it was assumed that the holes 5 have a refractive index of 1.0 while the two-dimensional plane has a refractive index of 3.0. Further, the calculation was made by approximating the actual three-dimensional structure by a two-dimensional model by using an equivalent refractive index approximation, and the band calculation analysis was made by applying a two-dimensional plane wave expansion method. The calculation was made for the case there holds a relationship r/a=0.30 between a radius "r" of the holes 5 and the period of repetition (lattice constant) "a" of the holes 5.

The photonic band diagram of FIG. 2 shows the band curves projected in the propagating direction of the line-defect waveguide 2 wherein it should be noted that the band curves existing in the photonic bandgap represent the propagation mode of light through the waveguide 2.

In FIG. 2, the horizontal axis corresponds to the wavenumber vector of the light thus guided through the line-defect waveguide 2 and represents a normalized wavenumber in terms of the unit ($2\pi/a$). On the other hand, the vertical axis represents a normalized frequency, which is a dimensionless quantity, calculated from ($\omega a/2\pi c_0$). Here, $\omega$ represents the angular frequency while $c_0$ represents the velocity of light in vacuum.

It should be noted that FIG. 2 actually shows the photonic band diagram of electric transverse mode (TE mode) in which there is included a magnetic component only in the direction perpendicular to the plane.

Referring to FIG. 2, the region C represented in FIG. 2 by gray is called slab mode region in which there is caused no optical confinement effect by the photonic crystal and the light propagates through the medium freely. In this region C, the effect of photonic crystal does not appear.

On the other hand, it can be seen that there exists a photonic bandgap between two slab mode regions, wherein it should be noted that there occurs optical confinement in such a photonic bandgap.

In the example of FIG. 2, it can be seen that there exist two propagation modes in the photonic bandgap corresponding to waveguide bands B01 and B02, wherein the present invention uses the band B01 for the region where the wavenumber is larger than a point A (anti-intersection), in which the band B01 and the band B02 comes closest in the photonic bandgap.

Figure 3A:
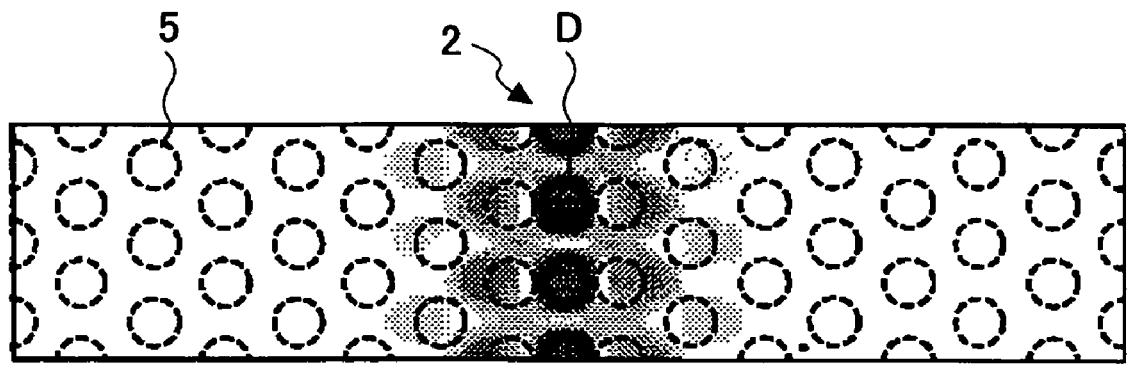
FIGS. 3A and 3B are diagrams respectively showing the distribution of electromagnetic field for an even mode and an odd mode.
Figure 3B:
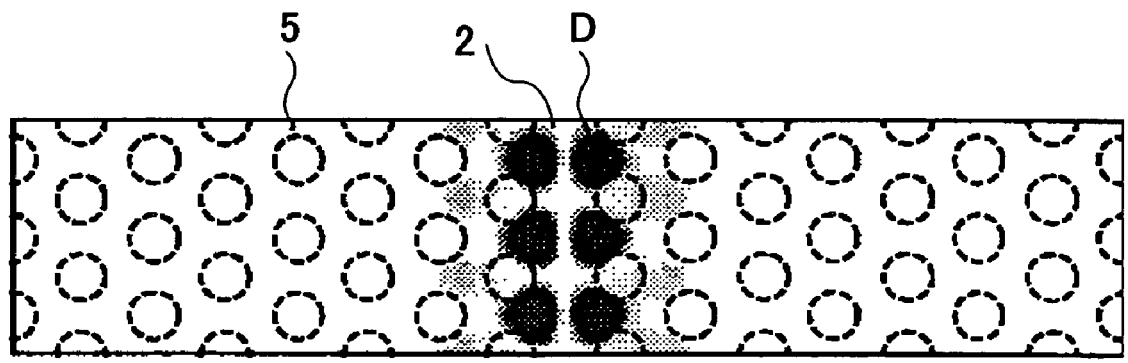

Here, the propagation mode of the band B01 is an even mode shown in FIG. 3A, in which there exists a peak D of electromagnetic intensity at the center of the line-defect waveguide 2, while the propagation mode for the band B02 becomes an odd mode shown in FIG. 3B in which it will be noted that the electromagnetic intensity becomes zero at the center of the line-defect waveguide 2. When causing propagation of light in a photonic crystal, it is easier to handle the even mode, and thus, it is preferable to construct the device to use the band B01.

With regard to the waveguide band B01, it is possible to calculate the group velocity as the gradient of the frequency represented as a function of the wavenumber vector k. The photonic band diagram of FIG. 2 represents the dispersion relationship between the normalized wavenumber and normalized frequency, and thus, the group velocity vg is calculated from the gradient of the photonic band diagram according to Equation (1) below.

$$v_g = \frac{\partial \omega}{\partial k} = \frac{c_0 \partial\left[\frac{\omega a}{2\pi c_0}\right]}{\partial\left[\frac{ka}{2\pi}\right]}$$ (Eq. 1)

Thus, the transmission velocity of light propagated through the line-defect waveguide 2 in the photonic crystal 3 is calculated in terms of the value normalized by the velocity of light in vacuum, by differentiating the band curve B01. Because the slope of the band B01 approaches zero at the band edge, it is predicted that the group velocity is decreased significantly at the band edge.

Figure 4A:
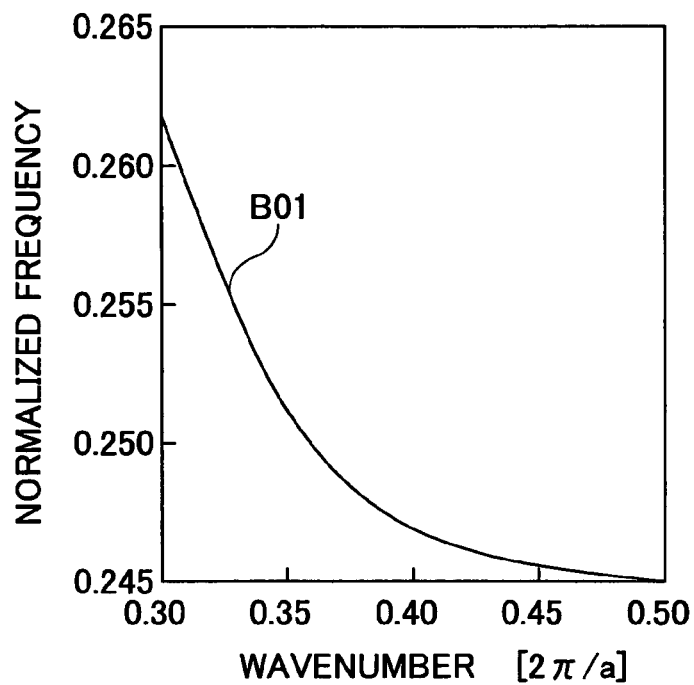
FIGS. 4A and 4B are diagrams respectively showing the band diagram of an even mode and a group velocity for the optical control device of FIG. 1.
Figure 4B:
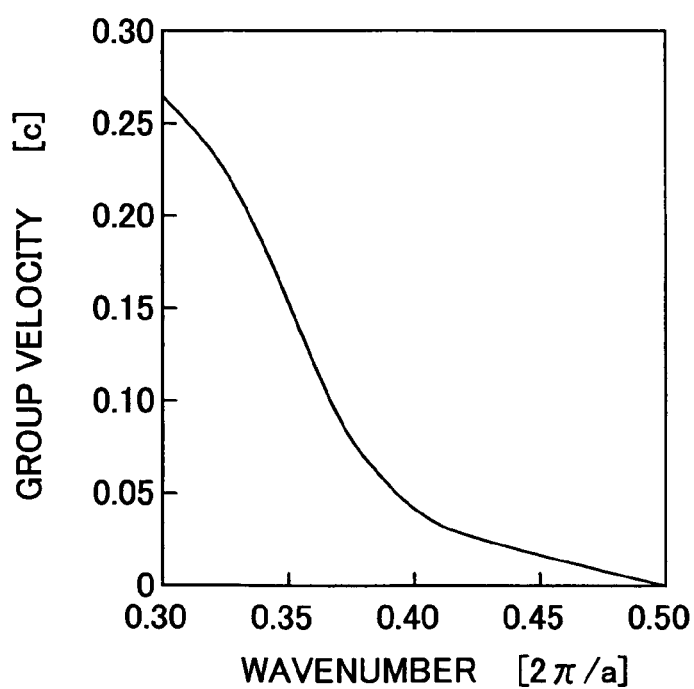

FIG. 4A shows the band B01 of FIG. 2 for the part larger in wavelength than the point A of FIG. 2 in an enlarged scale, while FIG. 4B shows the group velocity corresponding to the band B01 of FIG. 4A.

As shown in FIG. 4A, the gradient of the band B01 decreases with increasing wavenumber, and thus, the group velocity vg decreases monotonously with the wavenumber. Particularly, it will be noted that the group velocity vg becomes 1/100 or less of the light velocity in vacuum at the band edge where the wavenumber takes the value of about 0.50.

Thus, by using such small group velocity vg, it is possible to realize various devices and apparatuses such as optical delay line or a device of large optical non-linearity. On the other hand, at such band edge, there also occurs increase of dispersion, and control of the group velocity becomes difficult.

Thus, explanation will be made hereinafter for the structure having a photonic band structure providing zero dispersion and very small group velocity vg in a non band-edge region.

Figure 5A:
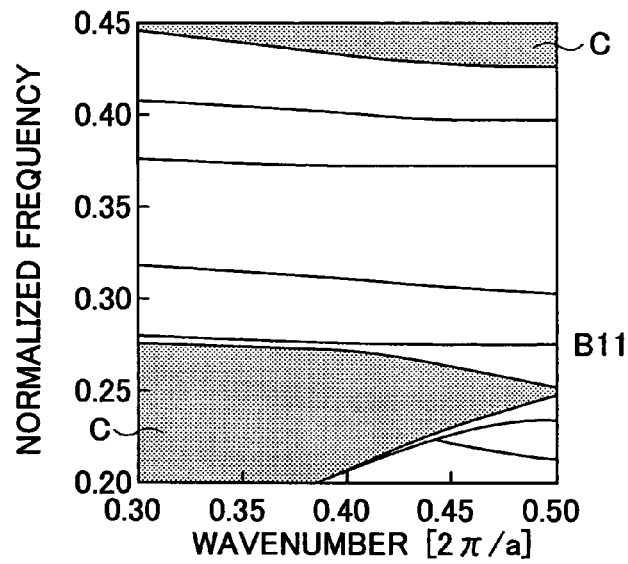
FIGS. 5A–5C are diagrams respectively showing the photonic bandgap, band diagram and group velocity for the optical control device of FIG. 1.

FIG. 5A shows the photonic band structure for the model structure of FIG. 1 in which the holes 5 of the refractive index 1.0 and the radius r are formed in the medium 4 of the refractive index 3.0 to form a triangular lattice having a period of repetition (lattice constant) a and the line-defect waveguide 2 is formed by removing a row of the holes 5 aligned on a straight line, wherein it should be noted that the ratio r/a is set to 0.394 with the present embodiment. Calculation of the photonic band gap was made according to the plane wave expansion method similarly to the case of FIG. 2.

Referring to FIG. 5A, it can be seen that there appear several bands in the photonic bandgap, wherein the present embodiment uses a band B11 located at the lowermost frequency side in the photonic bandgap.

Figure 5B:
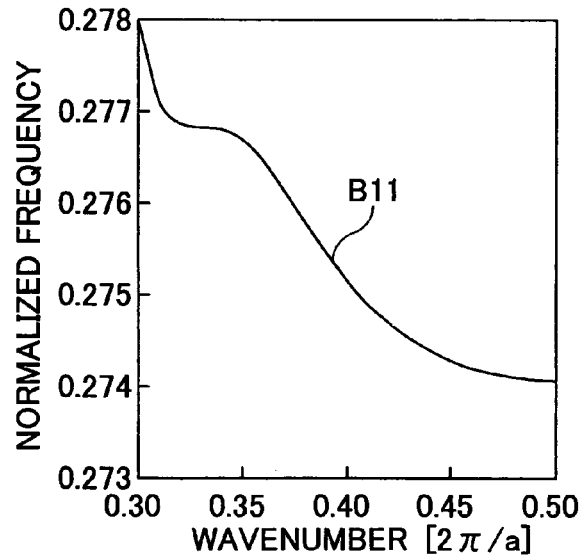

FIG. 5B shows the band B11 with enlarged scale for the normalized frequency $\omega$.

Referring to FIG. 5B, there exist two points where the slope of the band curve becomes almost constant.

FIG. 5B shows the group velocity calculated from the band B11 of FIG. 5B.

Figure 5C:
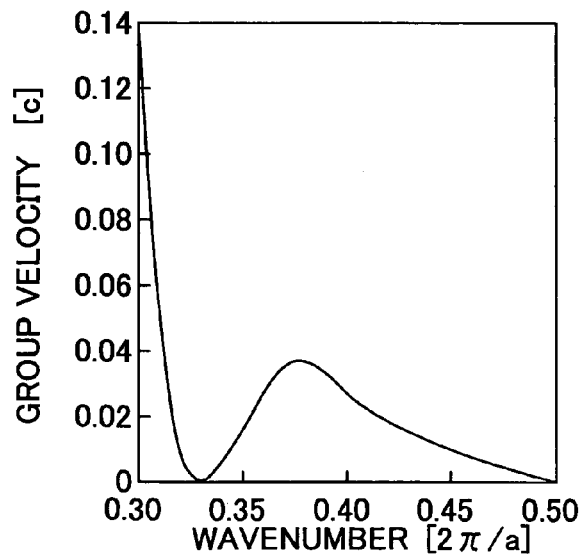

Referring to FIG. 5C, there exist two zero dispersion points where the slope of the group velocity vg becomes zero in correspondence to the two inflection points in the band B11, one at the wavenumber k of 0.330 and the other at the wavenumber k of 0.375.

Here, it should be noted that such a inflection point does not exist in the case when the ratio r/a is 0.300 or less. This means that such inflection point appears in a specific range of the r/a ratio of larger than 0.300 (r/a>0.300) under influence of a refractive index band and a waveguide tube band. Here, it should be noted that "refractive index band" is a photonic band that appears as a result of the refractive photonic crystal 3 having a lower refractive index as compared with the refractive index of the line-defect waveguide 2, while the waveguide tube band is a band that appears as a result of Bragg reflection of the photonic crystal. It should be noted that the foregoing waveguide band is formed as a result of interaction of these two bands.

Because each band changes within the bandgap with the period a of the holes 5 and the ratio r/a, it is possible to form the band B11 such that the band B11 includes two inflection points as noted above.

Thus, by causing the line-defect waveguide 2 to guide a light having the frequency in the vicinity of the inflection point of the band B11, it is possible to realize a very small group velocity and at the same time achieve zero frequency dispersion for that group velocity.

Second Embodiment

Now, there are two wavenumber values corresponding to these two inflection points both characterized by small group velocity and zero dispersion, while there are differences between these two inflection points.

At the wavenumber k of 0.330 (k=0.330), the group velocity is very small and a value of $\frac{1}{1000}$ or less of the light velocity in vacuum is realized. This means that almost zero dispersion is realized, while there is a problem with this point that the band width of zero dispersion is very small.

However, by applying this band curve B11 to the photonic crystal of the distributed refractive index type proposed in the United States Patent Application Publication 2005/0152659A1, which is incorporated herein as reference, it becomes possible to obtain the proposed effect by merely moving the band up and down by a slight change of the refractive index.

The principle of this will be explained with reference to FIGS. 6 and 7.

Figure 6:
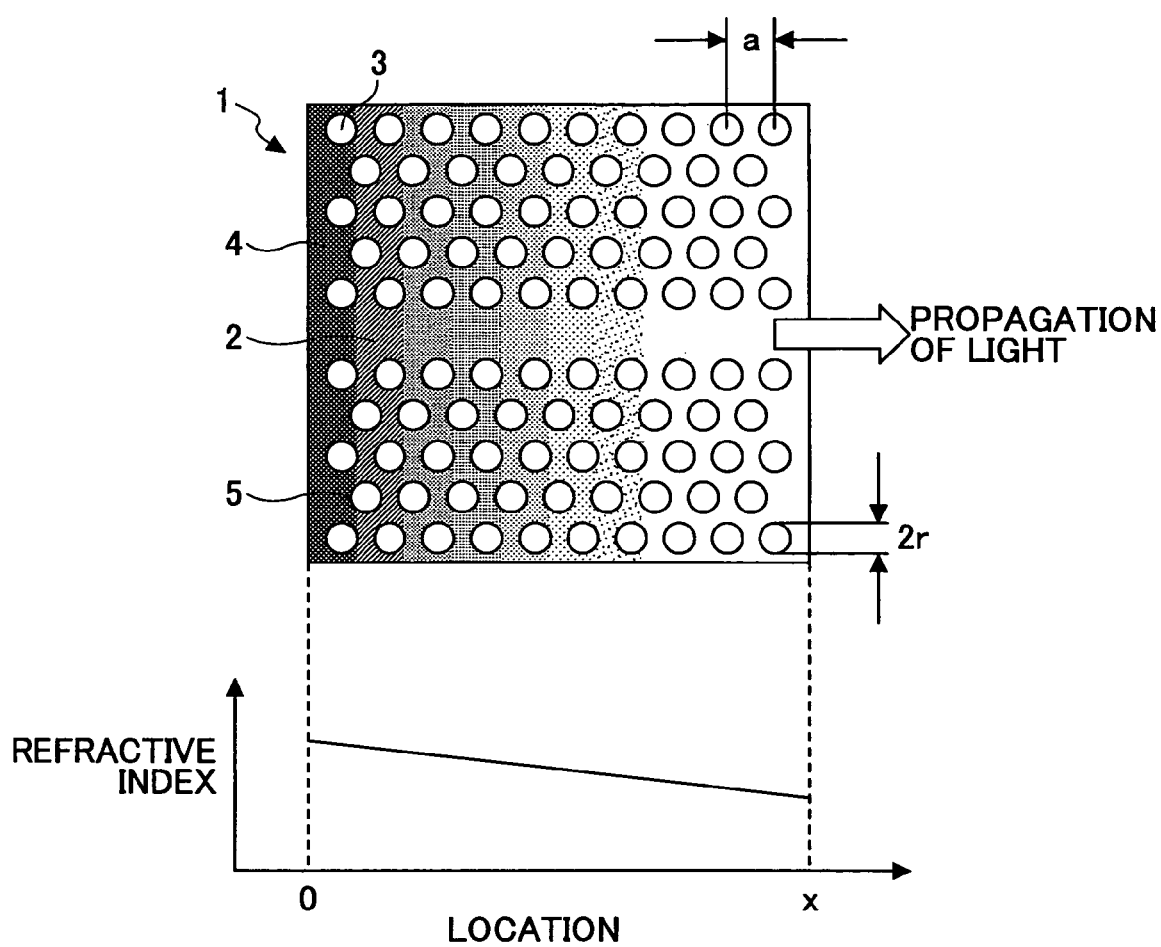
FIG. 6 is a diagram showing the construction of an optical control device according to another embodiment having a distributed refractive index profile in a propagating direction of light.
Figure 7:
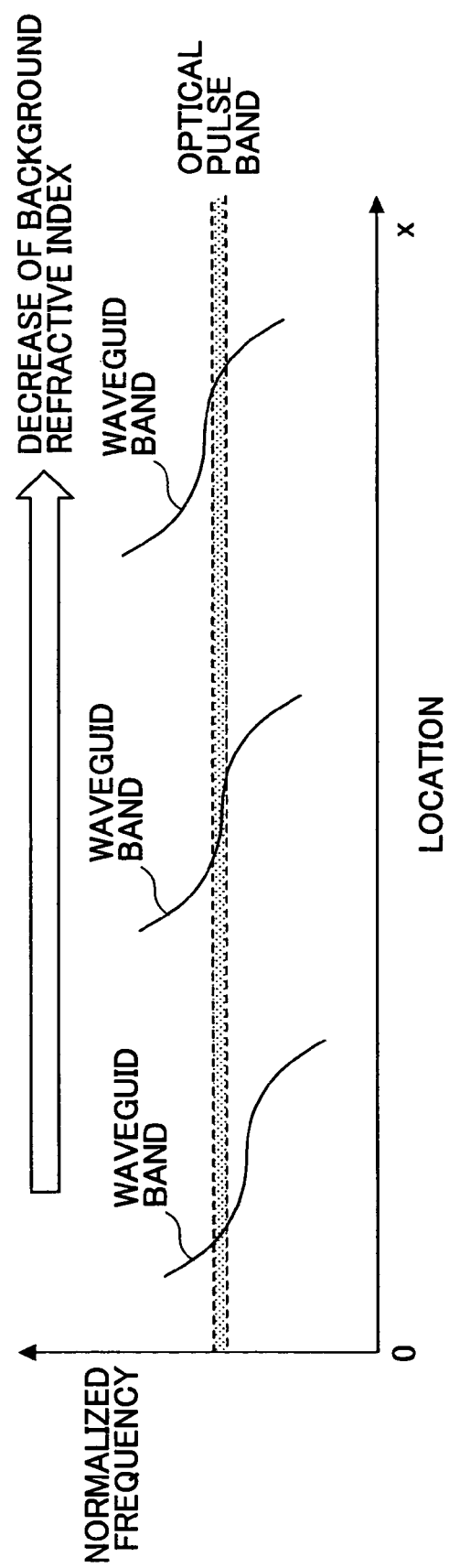
FIG. 7 is a diagram showing the band structure of a line-defect waveguide having a refractive index distribution in a propagating direction of light.

The case is considered in which the line-defect waveguide 2 has a distributed refractive index profile that decreases the refractive index gradually in the propagating direction of light in the line-defect waveguide 2 as shown in FIG. 6 and an optical pulse having a specific frequency range is caused to propagate through the line-defect waveguide 2.

In such a case, the waveguide band moves up and down across the band width of optical pulse with the gradual change of the refractive index of the line-defect waveguide 2, wherein the waveguide band moves across the zero group velocity region for each frequency and the optical dispersion is compensated for as the optical pulse travels through the line-defect waveguide 2. With this, the propagation speed of the optical pulse can be decreased significantly without causing spreading of the optical pulse.

Conventionally, it has been known by numerical calculations that the foregoing function can be realized by synthesizing two waveguide bands of different dispersion characteristics. However, there has been no proposal to realize this function by using a single waveguide band of the same construction.

By using the band curve B11, it becomes possible to realize the foregoing function by using a single line-defect waveguide, and complex calculation for synthesizing plural waveguide bands can be eliminated. Further, with the use of single line-defect waveguide 2, it is possible to increase the integration density of the optical control device.

Now, at the wavenumber k of 0.375 (k=0.375), the group velocity is not so small as compared with the foregoing case of the wavenumber k of 0.330. Even so, a group velocity of $\frac{1}{25}$ of the light velocity $c_0$ (0.04$C_0$) in vacuum is reached and there is achieved a further advantage at this wavenumber in that a relatively wide-region is secured for zero dispersion as compared with the case of the wavenumber k of 0.330. At this wavenumber of 0.375, it is possible to obtain large dispersion effect and optical pulse delay effect without using a coupled-defect waveguide.

Further, with the structure of the present embodiment, there arises no problem of optical transmission loss, which has been the largest problem with the conventional coupled-defect waveguide. Thus, similarly to a line-defect waveguide, it is possible with the present embodiment to cause propagation of light in the state confined in a waveguide, and it is possible to fully exploit the effect of defect-coupled waveguide with simple construction.

Further, by using the region of slow group velocity, it is possible with the present embodiment to construct a compact optical delay line, dispersion compensation device, or the like. Further, it is possible to induce the non-linear effect locally in a very limited part.

Third Embodiment

Next, an embodiment will be explained that decreases the group velocity while maintaining the large dispersion effect and the optical pulse delay effect achieved at the wavenumber k of 0.375 with reference to FIG. 8A–8C.

Figure 8A:
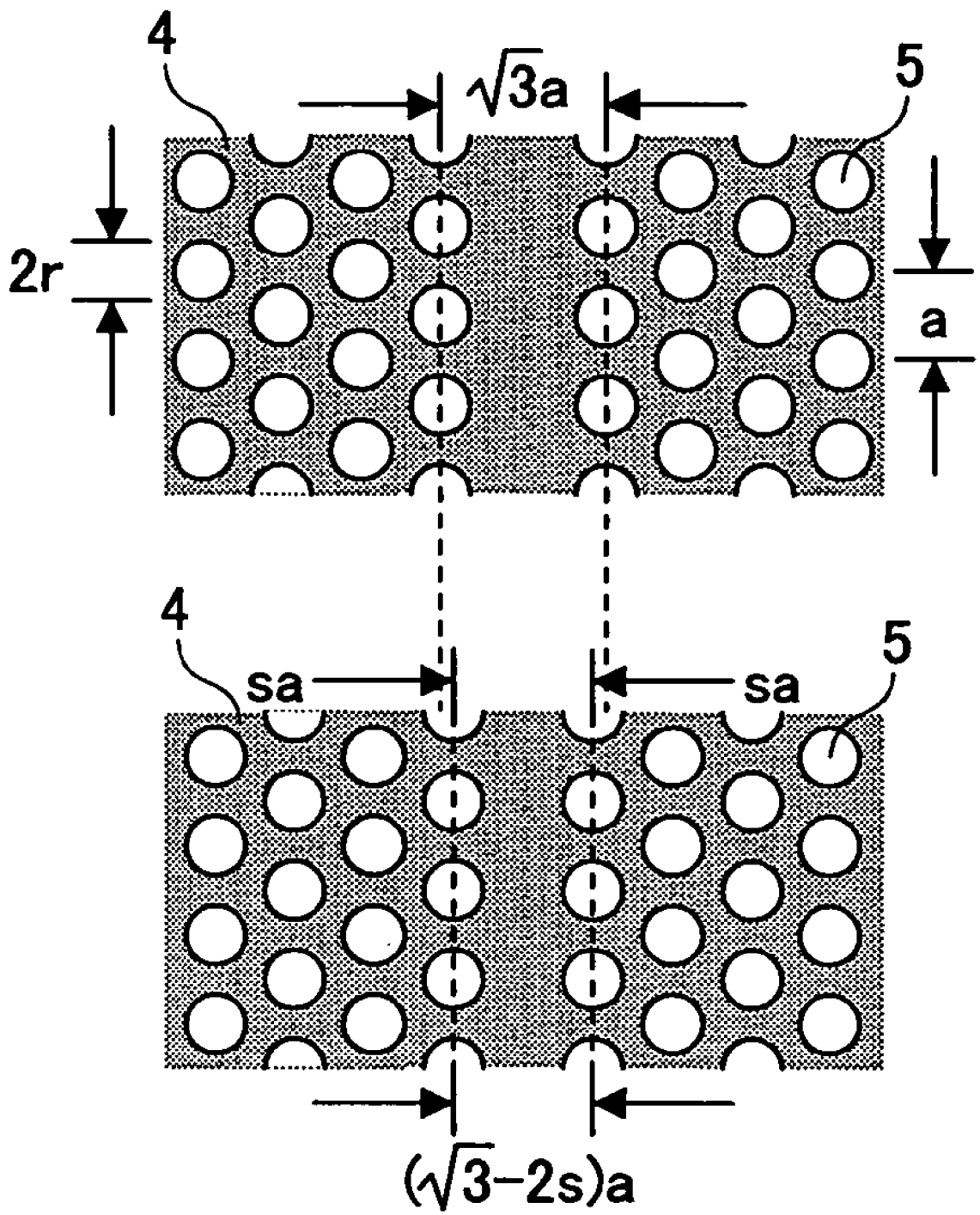
FIGS. 8A–8C are diagrams respectively showing the plan view of an optical control device according to another embodiment, the band structure and group velocity of the device of FIG. 8A for the case the width of the line-defect waveguide is changed.
Figure 8B:
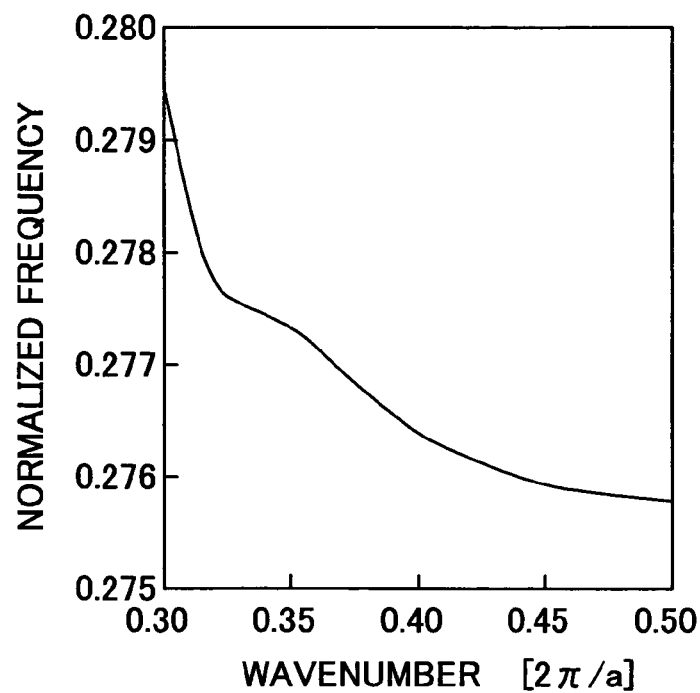

FIG. 8A is a diagram showing the line-defect waveguide 2 of FIG. 1 for the case the width of the line-defect waveguide 2 formed by removing the holes 5 aligned on a row, is changed to ($\sqrt{3}$−2s)×a, while FIG. 8B shows the band diagram for the case the parameter s is set to 0.001 and the photonic crystals at both lateral sides of the line-defect waveguide 2, which has the width of ordinary line-defect waveguide formed by removing one row of circles 5, are shifted toward the center of the waveguide 2 by a distance of 0.01a.

By doing so, it is possible to realize the waveguide band at a higher normalized frequency as shown in FIG. 8B as compared with the case in which the width of the line-defect waveguide 2 is not changed.

Figure 8C:
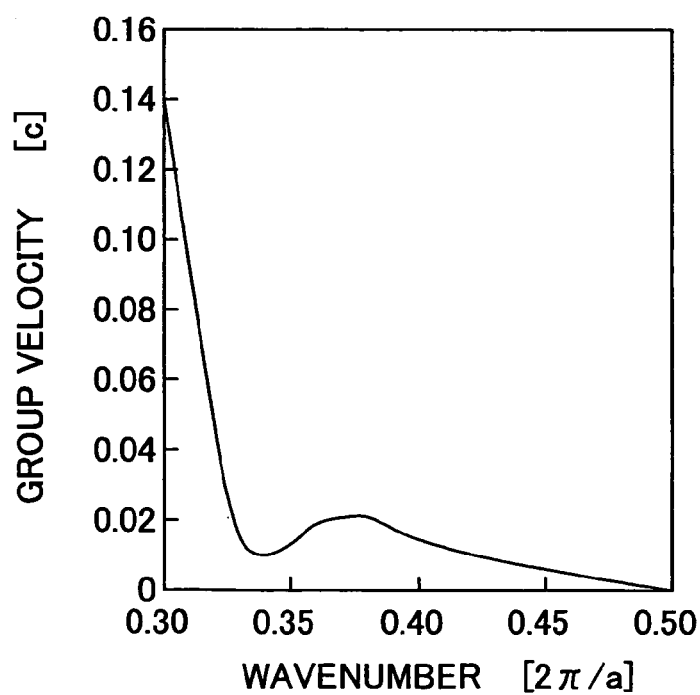

As shown in FIG. 8C, the group velocity calculated from the band diagram of FIG. 8B includes two zero dispersion points characterized by zero slope of the group velocity. Particularly, the group velocity at the wavenumber k of 0.375 (k=0.375) has the value of $\frac{1}{40}$ of the light velocity in vacuum (0.025$C_0$) and shows zero dispersion, while this means that the group velocity can be reduced to by one-half by changing the width of the line-defect waveguide 2 as compared with the case of FIG. 5C.

At the wavenumber k of 0.330, the group velocity becomes 0.01$C_0$ with the present embodiment, and thus, the wavenumber at this wavenumber is not as small as in the case of FIG. 5C. Still, this group velocity is small enough for the optical control device to achieve large effect. Further, the region of zero dispersion is expanded as compared with the case of not changing the width of the line-defect waveguide 2, and thus, control of the device can be achieved relatively easily.

Further, by controlling the ratio r/a between the radius r and the repetition period of the holes 5 together with the width of the line-defect waveguide 2, it becomes possible to change the group velocity as desired. Thus, it becomes possible with the present embodiment to tailor the design of line-defect waveguide 2 to the desired group velocity or normalized frequency by controlling the band structure.

Fourth Embodiment

Next, description will be made for the case the high-refractive index medium 4 has a refractive index of 2.0 and the holes 5 are formed in the medium 4 with the ration r/a of 0.400 (r/a=0.400).

Figure 9A:
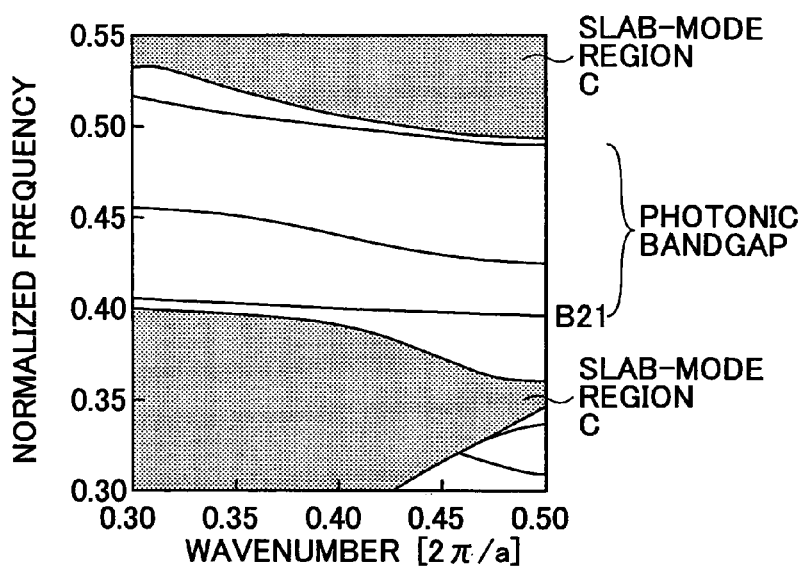
FIGS. 9A–9C are diagrams respectively showing the photonic bandgap, the band structure and group velocity for the case the refractive index of a film and the period to radius ratio of the holes in the photonic crystal are changed.
Figure 9B:
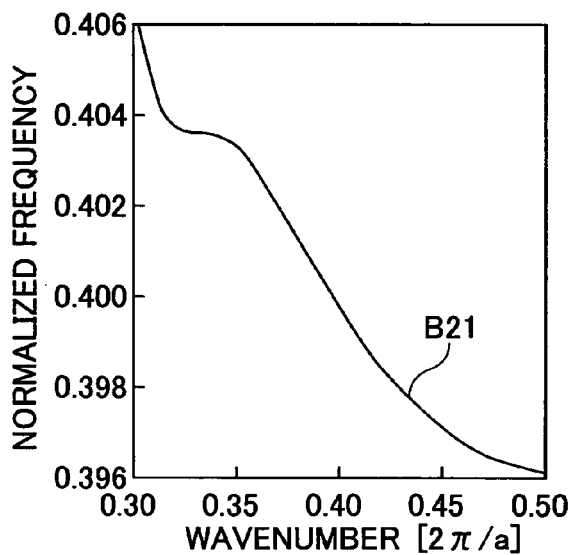
Figure 9C:
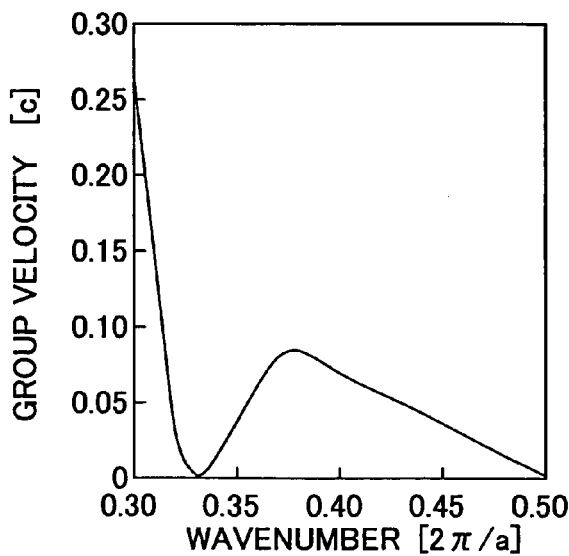

FIGS. 9A–9C show the calculation of the band diagram of the line-defect waveguide 2 according to the two-dimensional plane wave expansion method for such a case, wherein FIG. 9A shows a photonic band diagram projected in the guiding direction of the waveguide, while FIG. 9B is an enlarged diagram showing an even mode band B21 of FIG. 9A. Further, FIG. 9C shows the group velocity for the band B21. It can be seen from FIG. 9C that the band B21 includes two inflection points where the group velocity of light is decreased significantly while these inflection points provide zero dispersion at the same time.

In the case the photonic crystal slab has been formed by using the high refractive index medium 4 having the refractive index of 2.0, there arises a need of confining the light in the slab. With the present embodiment, it is possible to confine the region of low group velocity within a confinement region bounded by the air at the upper and lower surfaces, by manipulating the band structure.

Figure 10A:
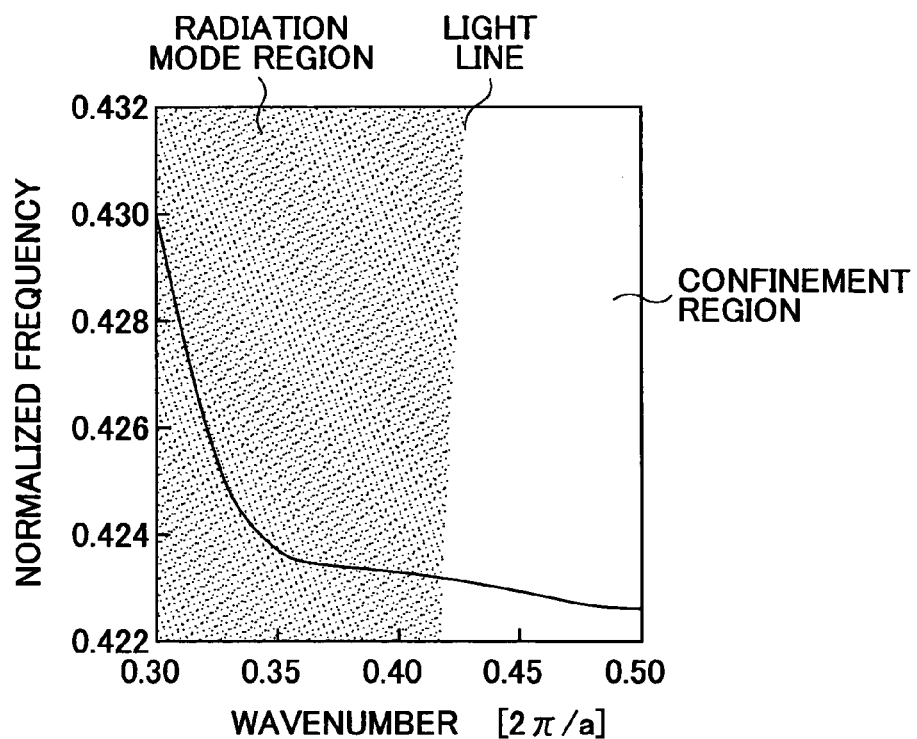
FIGS. 10A and 10B are diagrams respectively showing the band structure and group velocity for the case the refractive index, the period to radius ratio of the holes forming the photonic crystal and the width of the line-defect waveguide are changed.
Figure 10B:
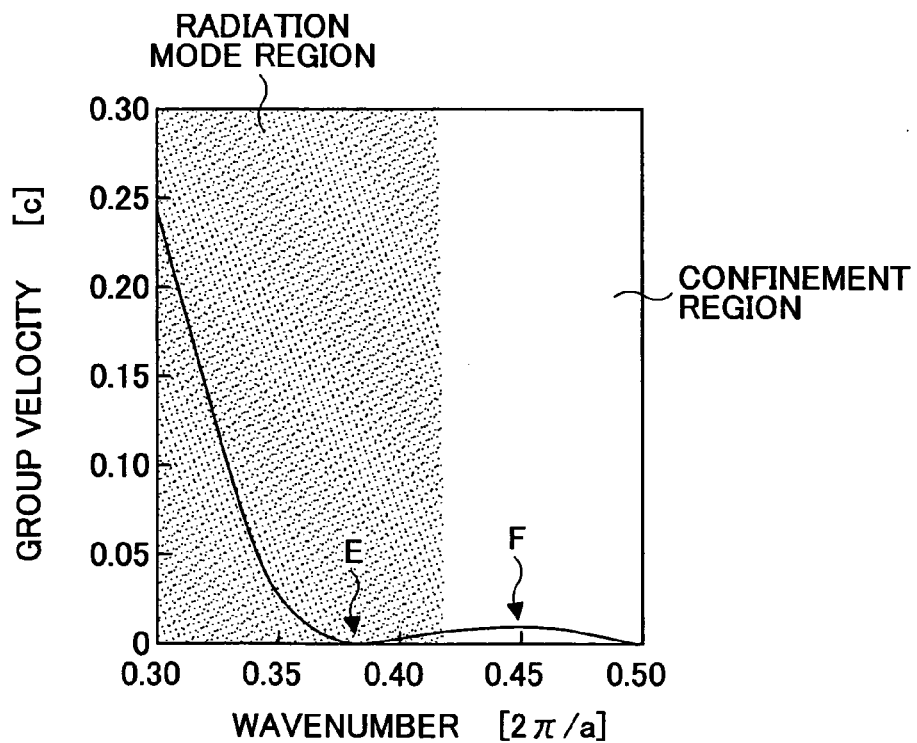

FIGS. 10A and 10B show the result of calculation for the case the width of the line-defect waveguide 2 is changed, wherein FIG. 10A shows the band diagram of the even mode, while FIG. 10B shows the group velocity corresponding to the band structure of FIG. 10A. It should be noted that FIGS. 10A and 10B show the result in which the width of the line-defect waveguide 2 has been reduced by the amount of 0.10s (s=0.10) toward the center of the waveguide.

Referring to FIGS. 10A and 10B, the gray part represents the radiation mode region, wherein it will be noted that there are two regions of small group velocity in correspondence to the two inflection points E and F of the band structure. Thereby, it is noted that the point E is in the radiation mode region while the point F is in the confinement region, and thus, it is possible to cause the light to propagate through the line-defect waveguide 2 with small optical loss, without the need of providing a particular optical confinement structure.

Because the group velocity at the point F is $0.01C_0$, which is about 1/100 of the light velocity in vacuum, the optical control device of the present embodiment can provide a very compact group velocity delay element or non-linear element. Further, with the structure of the present embodiment, dispersion of the group velocity changes the sign thereof in the vicinity of the point of zero dispersion, and it is possible to change the dispersion over a large amount. Thereby, the present embodiment is useful for dispersion compensation element.

When the width of the line-defect waveguide 2 is to be changed with the present embodiment, it is preferable to set the change amount s to be less than 0.30 (s<0.30), more preferably less than 0.25 (s<0.25). When the change amount s is 0.30 or more, the waveguide band under consideration goes outside the bandgap and it becomes difficult to expect the effect of the present invention.

Fifth Embodiment

While the foregoing embodiment has been explained for the case of changing the group velocity and achieving the zero frequency dispersion by controlling the ratio r/a of the holes 5 of the photonic crystal 3 or the width of the line-defect waveguide 2, the same effect can be achieved also by changing the refractive index of the defect part where the line-defect waveguide 2 is formed as compared with the refractive index of the photonic crystal located at both lateral sides of the line-defect optical waveguide 2.

Figure 11A:
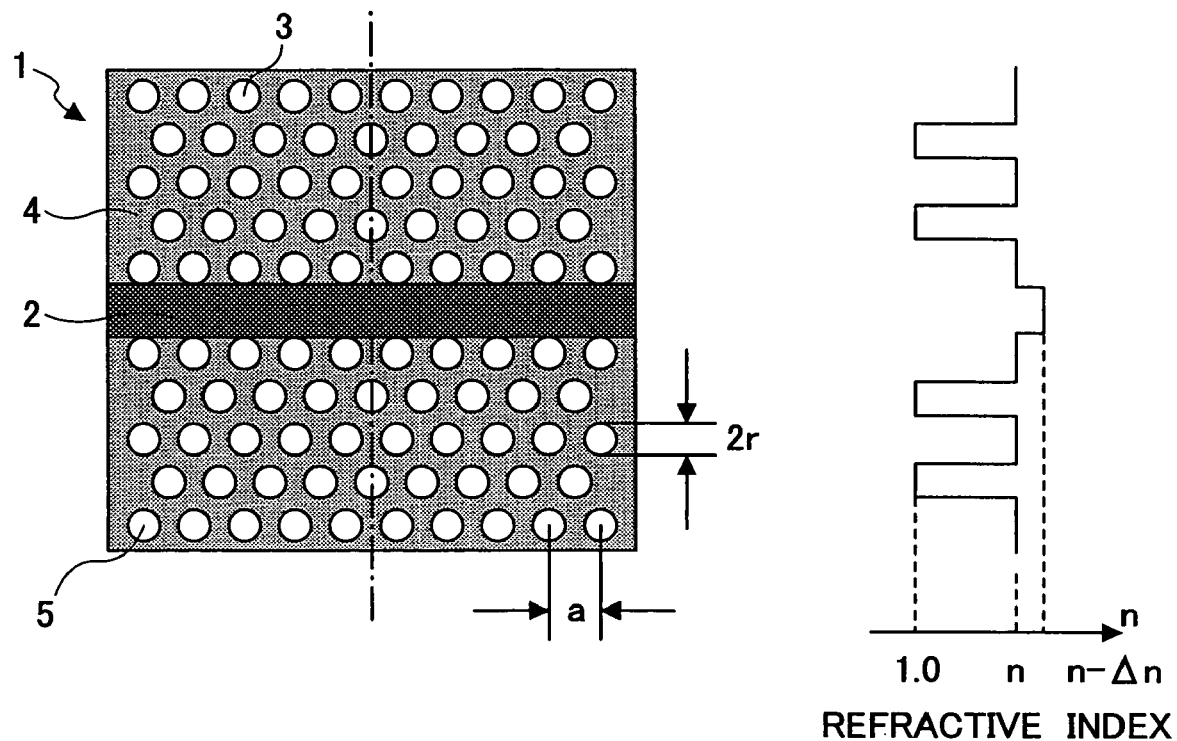
FIGS. 11A–11C are diagrams respectively showing the construction of an optical control device, a band diagram thereof and a group velocity thereof for the case of changing the construction of the photonic crystal and the refractive index of the line-defect waveguide.

FIG. 11A shows such an example in which the medium 4 forming the photonic crystal 3 has the refractive index of 4.0 and the holes 5 of the refractive index of 1.0 are formed therein similarly as before, except that the present embodiment forms the line-defect waveguide 2 to have the refractive index of 2.1.

Thereby, it should be noted that the foregoing region of the refractive index of 2.1 has been formed with a width smaller than the width of the line-defect waveguide 2 by the amount of the diameter a of the holes 5.

Figure 11B:
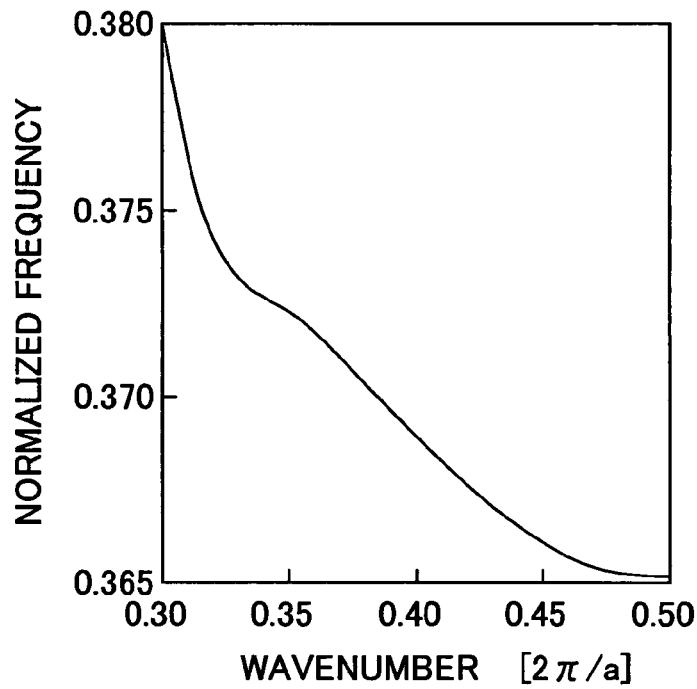
Figure 11C:
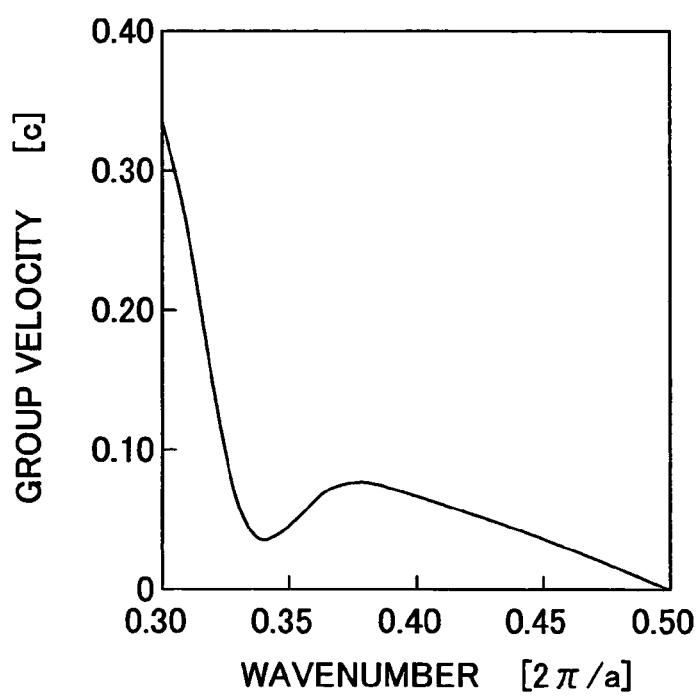

FIG. 11B shows the even mode band for such a device structure while FIG. 11C shows the corresponding group velocity.

As can be seen in FIG. 11B, the band curve has two inflection points, and there appear corresponding two points of small group velocity and zero dispersion in the group velocity curve. It should be noted that the foregoing two inflection points provide the group velocities of $0.04c_0$ and $0.08c_0$, respectively. Further, it is preferable that the magnitude of change of the refractive index in the line-defect waveguide 2 with respect to the region of the photonic crystal 3 is within ±20%, more preferably within ±5%–±10%. When the refractive index of the waveguide 2 is changed by 20% or more, the waveguide band goes outside the bandgap, and it is difficult to obtain the foregoing effect.

Sixth Embodiment

Further, similar effect of distorting the photonic band can be obtained also by modifying the shape of the "elements" 5 constituting the photonic crystal 3 in the vicinity of the line-defect waveguide 2. Thus, the elements 5 constituting the photonic crystal 3 are not limited to circular holes, but it is also possible to use rectangles, ellipses, triangles, polygons, circles or combination of these.

Further, it is also possible to achieve the similar effect by changing the size of the holes 5 in the vicinity of the line-defect waveguide 2.

Figure 12A:
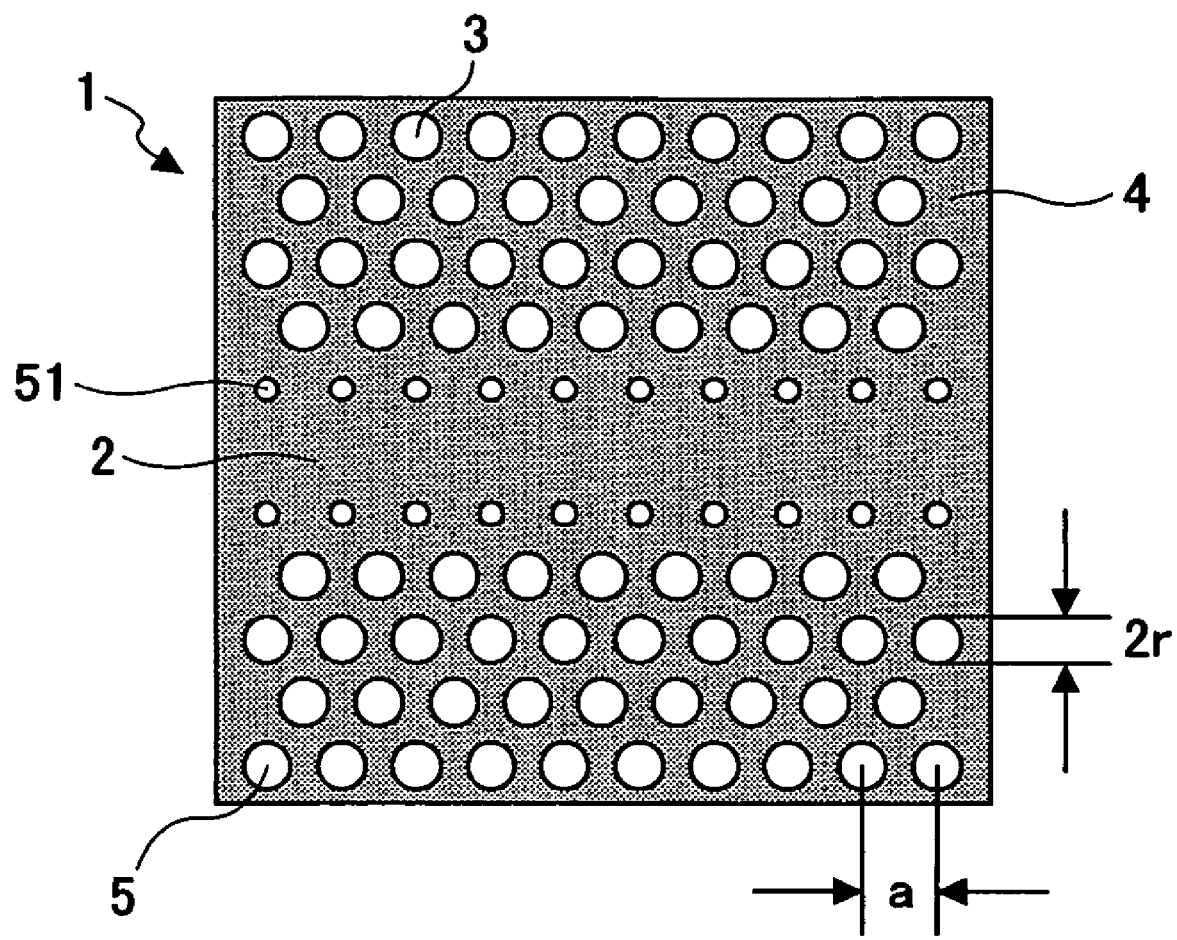
FIGS. 12A–12C are diagrams respectively showing the construction of an optical control device, the band diagram and the group velocity for the case of changing the construction of the photonic crystal in the vicinity of the line-defect waveguide.
Figure 12B:
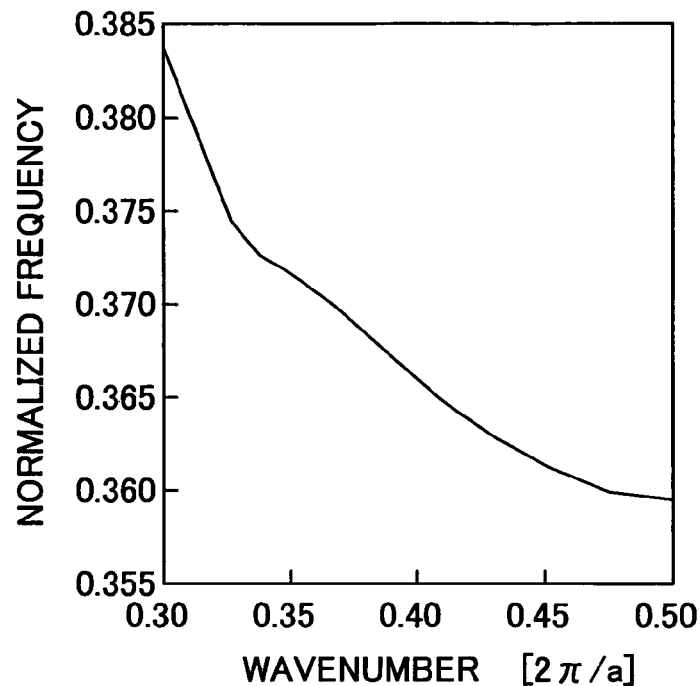

Thus, FIG. 12A shows an embodiment in which the diameter of the holes 5 is reduced in the vicinity of the line-defect waveguide 2 to form small holes 51, while FIG. 12B shows the band diagram of the structure of FIG. 12A. Further, FIG. 12C shows the group velocity corresponding to the band diagram of FIG. 12B.

Figure 12C:
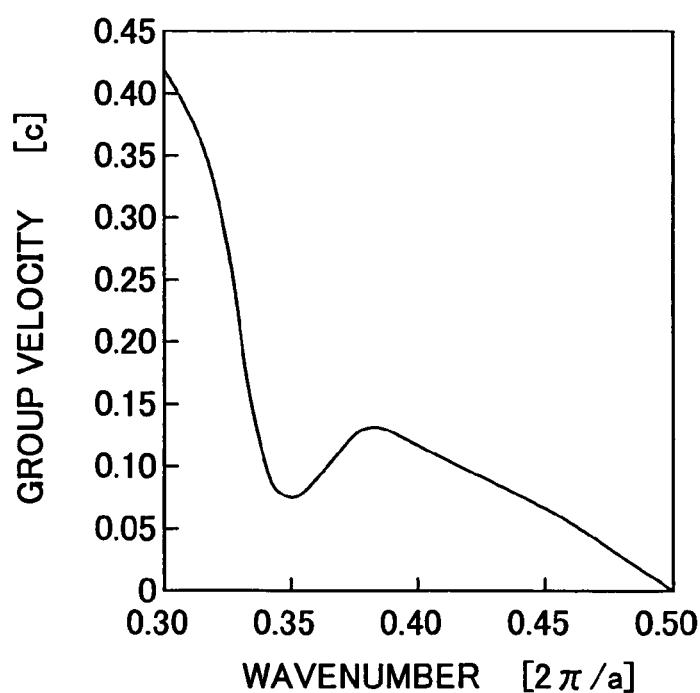

More specifically, FIG. 12B shows the band diagram of the even mode waveguide band for the case the holes 51 formed adjacent to the optical guide region of the line-defect waveguide 2 in alignment in a single row have a radius set to be 0.80 times as large as the radius of the holes 5 forming the photonic crystal 3 in the region outside the holes 51, while FIG. 12C shows the group velocity curve of such a structure.

Referring to FIGS. 12B and 12C, it can be seen that the band diagram includes two inflection points each providing zero dispersion and low group velocity.

Preferably, the holes 51 have a radius smaller than the radius of the holes 5 by the factor of 0.60 or more, more preferably in the range of 0.70 times to 0.90 times. When this factor is less than 0.60, the waveguide band goes outside the bandgap, while when this exceeds 0.90 times, the effect of using the small holes does not appear conspicuously.

Further, by adjusting the width and refractive index of the line-defect waveguide 2 together with adjustment of arrangement or shape of the elements 5 constituting the photonic crystal 5 in the vicinity of the line-defect waveguide 2, it becomes possible to construct the line-defect waveguide 2 in the photonic crystal with controlled group velocity and zero dispersion. Thereby, it becomes possible to provide the optical control device 1 of compact size with the feature of zero frequency dispersion for the group velocity, such that it is possible with such an optical control device 1 to variably control the group velocity and the dispersion.

Seventh Embodiment

Next, fabrication process of the optical control device 1 will be described.

First, the two-dimensional photonic crystal 3 is formed, wherein such a two-dimensional photonic crystal is easily formed by processing an SOI substrate by a fine patterning technology used with semiconductor processing. For example, an SOI substrate having a silicon layer of the thickness of 0.2 µm is already marketed, and the photonic crystal 3 can be formed by forming a triangular array of circular holes by lithography and dry etching.

For example, an electron beam resist is applied on such an SOI substrate and circular holes are patterned on the electron beam resist by an electron beam exposure process with a diameter of 400 nm. It should be noted that the diameter of the holes is determined by the wavelength in which the photonic crystal is to be used.

Further, while using the resist pattern thus formed as a mask, the silicon layer of the SOI substrate is subjected to a dry etching process while using a fluorocarbon gas, and the circular hole patterns are formed in the silicon layer.

Thereafter, the electron beam resist is removed, and the silicon oxide layer underlying the patterned silicon layer is removed by an etching process using HF. With this, the photonic crystal is obtained in the form of air bridge structure in which the patterned silicon layer is exposed to the air. With such a structure, very efficient optical confinement is achieved in the silicon layer as a result of difference of refractive index between silicon and the air.

Further, such a photonic crystal of air bridge structure can be formed also by using a semiconductor hetero substrate having oxidation selectivity, such as a GaInAsP/InP substrate or combination of AlGaAs/GaAs substrate and an oxide cladding layer.

Further, such an air bridge structure can be formed by the steps of: forming a thin film of an electro-optic material or non-linear optic material on a sacrifice layer by way of fusion, crystal growth, low-temperature jointing, or the like; and removing the sacrifice layer by a selective etching process.

For example, a separation layer is formed in a $LiNbO_3$ substrate by an ion implantation process, and the $LiNbO_3$ substrate is jointed with an SOI substrate. Further, the $LiNbO_3$ substrate is divided at the separation layer to form a structure in which a $LiNbO_3$ thin film is carried on the SOI substrate.

Further, an electron beam resist is applied to the $LiNbO_3$ thin film thus formed, followed by a patterning process conducted by electron beam lithography to form a resist mask pattern. Further, the $LiNbO_3$ film is subjected to a patterning process by applying a dry etching process while using the resist mask pattern as a mask, and with this, the resist pattern is transferred to the $LiNbO_3$.

Further, the underlying Si layer is removed by a selective etching process, and there is obtained an air-bridge structure of $LiNbO_3$ thin film.

In the case satisfactory selectivity of dry etching is not secured with a resist mask pattern, it is possible to use a metal mask pattern.

In this case, a metal film is formed on a substrate by evaporation deposition process, or the like, and the metal film is subjected to a lithographic process to form the metal mask pattern.

Further, with this technology, it is not always necessary to use a $LiNbO_3$ substrate subjected to ion implantation process for forming the thin film of $LiNbO_3$ but such a thin film cam be formed by polishing the $LiNbO_3$ substrate to a submicron thickness in the state the $LiNbO_3$ substrate is held on a sacrifice substrate.

Further, it is possible to form the $LiNbO_3$ substrate on a low-refractive index medium instead of a sacrifice layer. In this case, the photonic crystal does not have the air bridge structure.

Further, it is possible to form a photonic crystal by transcription process conducted by using a mold.

For example, a mold having an inversion pattern of the photonic crystal, which may include an array of pillars, is formed, and a liquid state material is poured upon such a mold. Further, a base substrate is jointed thereto. Thereafter, the material is solidified by sintering or the like, and the desired photonic crystal is obtained by removing the mold.

With this technology, it is possible to mass produce the photonic crystals easily. Thereby, it is advantageous to form the mold by a material that can be formed by electron beam exposure or dry etching and causes shrinkage upon sintering. Thereby, removal of the photonic crystal from the mold is facilitated substantially. Thereby, the size of the photonic crystal can be controlled as desired by designing the mold by taking into consideration the effect of shrinkage thereof.

With this technology of using a mold, production of the photonic crystals can be achieved repeatedly without using a vacuum apparatus, and the cost of the photonic crystal can be reduced significantly.

While the substrates produced by the foregoing processes explained are exposed to the air, it is also possible to cover the top surface of the photonic crystal by a low refractive index medium. Such coverage of the photonic crystal surface is achieved easily by depositing an oxide layer to form a cladding layer or by applying a polymer layer by way of spin-coating process.

Particularly, with the use of a material such as a semiconductor material having a large refractive index in the wavelength band of optical communication, it becomes possible to secure a large bandgap for the photonic crystal. Further, it becomes possible to produce the photonic crystal of high precision by using high precision semiconductor processing technology. Thereby, it becomes possible to form the line-defect waveguide 2 having a bandgap such that there is included an even-mode band having two inflection points relatively easily.

Further, by using an electro-optic material or non-linear optic material, the foregoing effects are realized actively.

For example, in a photonic crystal of an electro-optic material, it is possible to cause a refractive index change by applying a voltage to the photonic crystal. Thereby, with the associated change of the band structure, it becomes possible to change the group velocity or its dispersion.

Thereby, it should be noted that this area of electric power application can be very small, and it becomes possible to construct the optical control device to have low electric power consumption.

Further, with the use of non-linear optic material, the non-linear effect obtained from the large delay of group velocity is enhanced significantly, and it becomes possible to form the optical control device, which has to be constructed to have a very large size, to have a compact size.

Further, in the case of using the construction that changes the refractive index by optical radiation, it is sufficient to apply the optical radiation to a very small area, and with this, it is possible to achieve low electric power operation.

Further, the present invention is by no means limited to the embodiments described heretofore, but various variations and modifications may be made without departing from the scope of the invention.

The present invention is based on Japanese priority application No. 2004-314918 filed on Oct. 29, 2004, the entire contents of which are incorporated herein as reference.

What is claimed is:

1. An optical device comprising:
a photonic crystal comprising a periodic repetition of an element; and
a line-defect waveguide formed in said photonic crystal in the form of a line-shaped defect,
said optical device being configured to guide, through said line-defect waveguide, a light having a wavenumber larger than a wavenumber corresponding to an intersection of an even-mode band and an odd-mode band, said even-mode band and odd-mode band being a waveguide band of said line-defect waveguide formed in said photonic crystal,
said even-mode band of said line-defect waveguide including two or more inflection points in a wavenumber region larger than a wavenumber corresponding to said intersection of said even-mode band and said odd-mode band,
said optical device being configured to guide a light having a frequency in the vicinity of one of said inflection point,
said photonic crystal further comprising an array of circular-shaped patterns disposed in a medium with a predetermined interval, each circular shaped pattern constituting said element and having a radius determined such that a ratio of said radius to said predetermined interval falls in a range of 0.35 or more but not exceeding 0.50, said predetermined interval being a distance measured from a center of a first circular-shaped pattern and a center of a second circular-shaped pattern adjacent to said first circular pattern, and
the optical device is constructed on a three-dimensional photonic crystal.

2. The optical device as claimed in claim 1, wherein said line-defect waveguide has a width different from a width formed by removing a row of said elements.

3. The optical device as claimed in claim 1, wherein said line-defect waveguide has a width smaller than a width formed in said photonic crystal by removing a row of said elements by a factor of 0.70 or more but not exceeding 1.00.

4. The optical device as claimed in claim 1, wherein said line-defect waveguide has a distributed profile of refractive index that changes continuously in a propagation direction of light in said line-defect waveguide.

5. The optical device as claimed in claim 1, wherein said line-defect waveguide is formed by removing a row of elements constituting said photonic crystal.

6. The optical device as claimed in claim 1, wherein said photonic crystal is formed by arranging circular holes of low refractive index each forming said element in said medium two-dimensionally in the form of a triangular lattice.

7. The optical device as claimed in claim 1, wherein said photonic crystal is formed by using a dielectric thin film for said medium.

8. The optical device as claimed in claim 7, wherein said dielectric thin film comprises a semiconductor material.

9. The optical device as claimed in claim 7, wherein said dielectric thin film comprises an electro-optic material.

10. The optical device as claimed in claim 7, wherein said dielectric thin film comprises a non-linear optic material.

11. An optical device comprising:
a photonic crystal comprising a periodic repetition of an element; and
a line-defect waveguide formed in said photonic crystal in the form of a line-shaped defect,
said optical device being configured to guide, through said line-defect waveguide, a light having a wavenumber larger than a wavenumber corresponding to an intersection of an even-mode band and an odd-mode band, said even-mode band and odd-mode band being a waveguide band of said line-defect waveguide formed in said photonic crystal,
said even-mode band of said line-defect waveguide including two or more inflection points in a wavenumber region larger than a wavenumber corresponding to said intersection of said even-mode band and said odd-mode band,
said optical device being configured to guide a light having a frequency in the vicinity of one of said inflection points, wherein said line-defect waveguide has a refractive index different from a part of said photonic crystal where there is formed a periodic structure of said element, and
the optical device is constructed on a three-dimensional photonic crystal.

12. An optical device comprising:
a photonic crystal comprising a periodic repetition of an element; and
a line-defect wave guide formed in said photonic crystal in the form of a line-shaped defect,
said optical device being configured to guide, through said line-defect waveguide, a light having a wavenumber larger than a wavenumber corresponding to an intersection of an even-mode band and an odd-mode band, said even-mode band and odd-mode band being a waveguide band of said line-defect waveguide formed in said photonic crystal,
said even-mode band of said line-defect waveguide including two or more inflection points in a wavenumber region larger than a wavenumber corresponding to an intersection of said even-mode band and said odd-mode band, said optical device being configured to guide a light having a frequency in the vicinity of one of said inflection points, wherein a periodic structure of said element constituting said photonic crystal is modified in the vicinity of said line-defect waveguide, and the optical device is constructed on a three-dimensional photonic crystal.

13. An optical device comprising:

a photonic crystal comprising a periodic repetition of an element; and a line-defect waveguide formed in said photonic crystal in the form of a line-shaped defect, said optical device being configured to guide, through said line-defect waveguide, a light having a wavenumber larger than a wavenumber corresponding to an intersection of an even-mode band and an odd-mode band, said even-mode band and odd-mode band being a waveguide band of said line-defect waveguide formed in said photonic crystal, said even-mode band of said line-defect waveguide including two or more inflection points in a wavenumber region larger than a wavenumber corresponding to an intersection of said even-mode band and said odd-mode band, said optical device being configured to guide a light having a frequency in the vicinity of one of said inflection points, wherein said photonic crystal is formed of an array of circular patterns each forming said element, and wherein a radius of said circular patterns is changed in the vicinity of said line-defect waveguide as compared with a remaining part of said photonic crystal, and the optical device is constructed on a three-dimensional photonic crystal.

* * * * *